(12) United States Patent
Ozer et al.

(10) Patent No.: US 9,608,923 B2
(45) Date of Patent: Mar. 28, 2017

(54) ADAPTIVE RESOURCE MANAGEMENT FOR MULTI-SCREEN VIDEO APPLICATIONS OVER CABLE WI-FI NETWORKS

(71) Applicant: General Instrument Corporation, Horsham, PA (US)

(72) Inventors: Sebnem Zorlu Ozer, Perkasie, PA (US); Robert L Howald, Orlando, FL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 56 days.

(21) Appl. No.: 14/210,338

(22) Filed: Mar. 13, 2014

(65) Prior Publication Data

US 2014/0269314 A1 Sep. 18, 2014

Related U.S. Application Data

(60) Provisional application No. 61/800,311, filed on Mar. 15, 2013.

(51) Int. Cl.
*H04L 12/825* (2013.01)
*H04L 29/06* (2006.01)

(52) U.S. Cl.
CPC .......... *H04L 47/25* (2013.01); *H04L 65/4084* (2013.01); *H04L 65/605* (2013.01); *H04L 65/80* (2013.01)

(58) Field of Classification Search
CPC ... H04L 47/25; H04L 65/4084; H04L 65/605; H04L 65/80
See application file for complete search history.

(56) References Cited

U.S. PATENT DOCUMENTS 7,457,313 B2 11/2008 Patrick
8,301,696 B2 10/2012 Myers et al.
(Continued)

FOREIGN PATENT DOCUMENTS

| WO | 2009/032214 A2 | 3/2009 |
| WO | 2011/125041 A2 | 10/2011 |

OTHER PUBLICATIONS

Dr. R. Howald, et al., "Web Surfing to Channel Surfing: Engineering the HSD Edge for Video", SCTE Cable-Tec Expo 2009.
(Continued)

*Primary Examiner* — Mounir Moutaouakil
(74) *Attorney, Agent, or Firm* — Thomas A. Ward

(57) ABSTRACT

Combining network and client based adaptive streaming approaches enable a distributed and adaptive resource management system for carrier quality video transmission over cable Wi-Fi systems. The adaptive resource management over cable Wi-Fi heterogeneous networks includes a network based approach using client based feedback. The resource management of a video stream is performed on a service provider's network, for example in a cable modem termination system, by evaluating a margin and a fairness index. In embodiments, the rate of a video stream to a requesting client is adjusted and, in embodiments, the rate of a video stream for non-requesting clients is adjusted. Embodiments include mechanisms for call admission control and adaptive streaming based on adjustable resource margins and fairness indices for DOCSIS and Wi-Fi hetnet systems.

14 Claims, 15 Drawing Sheets

(56) References Cited

U.S. PATENT DOCUMENTS

| | | | |
|---|---|---|---|
| 8,644,144 B2* | 2/2014 | Wang | H04L 41/5003 370/230 |
| 2008/0080388 A1 | 4/2008 | Dean et al. | |
| 2010/0228862 A1 | 9/2010 | Myers | |
| 2010/0228875 A1 | 9/2010 | Myers | |
| 2011/0082945 A1 | 4/2011 | Myers et al. | |
| 2011/0149145 A1 | 6/2011 | Ramos et al. | |

OTHER PUBLICATIONS

Kanhere and Sethu, "On the latency bound of deficit round robin", ICCCN 2002.

X. Liu, et al., "Variable Bit Rate Services in DOCSIS 3.0 Networks".

R. Howald, et al., "Delivering Pixel Perfect", NCTA Cable Show 2010.

L Lenzini, et al., "Full exploitation of the deficit round robin capabilities by efficient implementation and parameter tuning", Technical Report, Oct. 2003.

Stiliadis, "Traffic scheduling in packet switching networks: analysis, design and implementation", Ph.D. Thesis, 1996.

E.W. Knightly, et al., "D-BIND: An accurate traffic model for providing QoS guarantees to VBR Traffic", IEEE/ACM Transactions on Networking, 5(2), Apr. 1997.

PKT-SP-DQOS-I12-050812 (PacketCable™ Dynamic Quality-of-Service Specification).

PKT-SP-QOS-I02-080425 (PacketCable™ 2.0 Quality of Service Specification).

PKT-SP-Codec-Media-I07-090702 (PacketCable™ 2.0 Codec and Media Specification).

"Delivering the Best Web Video Experience: Session Based Delivery", SeaWell Networks, Inc.

PCT Search Report & Written Opinion, RE: Application #PCT/US2014/026891; dated Jul. 28, 2014.

Official Action, RE: Canadian Application No. 2,903,858, dated Oct. 4, 2016.

* cited by examiner

ADAPTIVE RESOURCE MANAGEMENT FOR MULTI-SCREEN VIDEO APPLICATIONS OVER CABLE WI-FI NETWORKS

CROSS-REFERENCE TO RELATED APPLICATION

The present application claims priority from U.S. Provisional Application U.S. patent application Ser. No. 61/800,311 filed on Mar. 15, 2013, entitled "Adaptive Resource Management for Multi-Screen Video Applications Over Cable Wi-Fi Networks," which is incorporated herein by reference in its entirety.

BACKGROUND

Existing solutions for streaming over Data Over Cable Service Interface Specification (DOCSIS) networks include network based adaptive variable bit rate (VBR) video streaming. However, network based control may not always track performance related changes effectively when the system consists of highly variable links and distributed architecture, such as cable Wi-Fi systems. The network controller may not be able to detect an end user's experience effectively or in a timely manner, which can lead to unfairness, instability and low network utilization. Current indoor and outdoor cable Wi-Fi deployments offer mostly best effort data as a free service to subscribers or with fixed plan rates to non-subscribers, while carrier grade video is aimed for next generation residential, commercial and public/community cable Wi-Fi networks.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying Figures serve to illustrate embodiments of concepts that include the claimed invention, and explain various principles and advantages of those embodiments, the claimed invention is not limited to the concepts displayed, as additional embodiments would be readily apparent to those of ordinary skill in the art having the benefit of the description herein such that a display of certain concepts are not necessary to understand such embodiments.

DETAILED DESCRIPTION

Disclosed herein are techniques for increasing network utilization and video quality over cable Wi-Fi heterogeneous networks by proposing an adaptive resource management system with network software based control using client based feedback, when available. In addition, the transmission of video traffic over cable Wi-Fi networks is addressed. Cable operators, using the disclosed techniques, are able to apply the hybrid network and client based control to offer carrier grade video services.

In embodiments, disclosed are approaches that combine network and client based adaptive streaming approaches to enable a distributed and adaptive resource management system for carrier quality video transmission over cable Wi-Fi systems. Further, embodiments include mechanisms for call admission control and adaptive streaming based on adjustable resource margins and fairness indices for DOCSIS and Wi-Fi hetnet systems.

Cable operators around the world aim to extend their Wi-Fi services as a result of recent successes and proliferation of new Wi-Fi devices and applications. Wi-Fi started to change the revenue generation from a traditional form of charging end users for voice and text to make money from access charges and selling services to third parties, depending on local regulations, operator's market, and competition status. To this end, "home spots" and "hotspots/hotzones" are being unified under operator's control and management to offer seamless services while the end user's control is not lost on heterogeneous network segments. Roaming partnerships and wholesale models are also being extended to offer seamless services for end-users. One of the applications the operators are exploring is carrier quality video to multi-screens in home and beyond through indoor and outdoor hotspots/hotzones including use cases such as hospitality, special events, location-based applications, etc.

Figure 1:
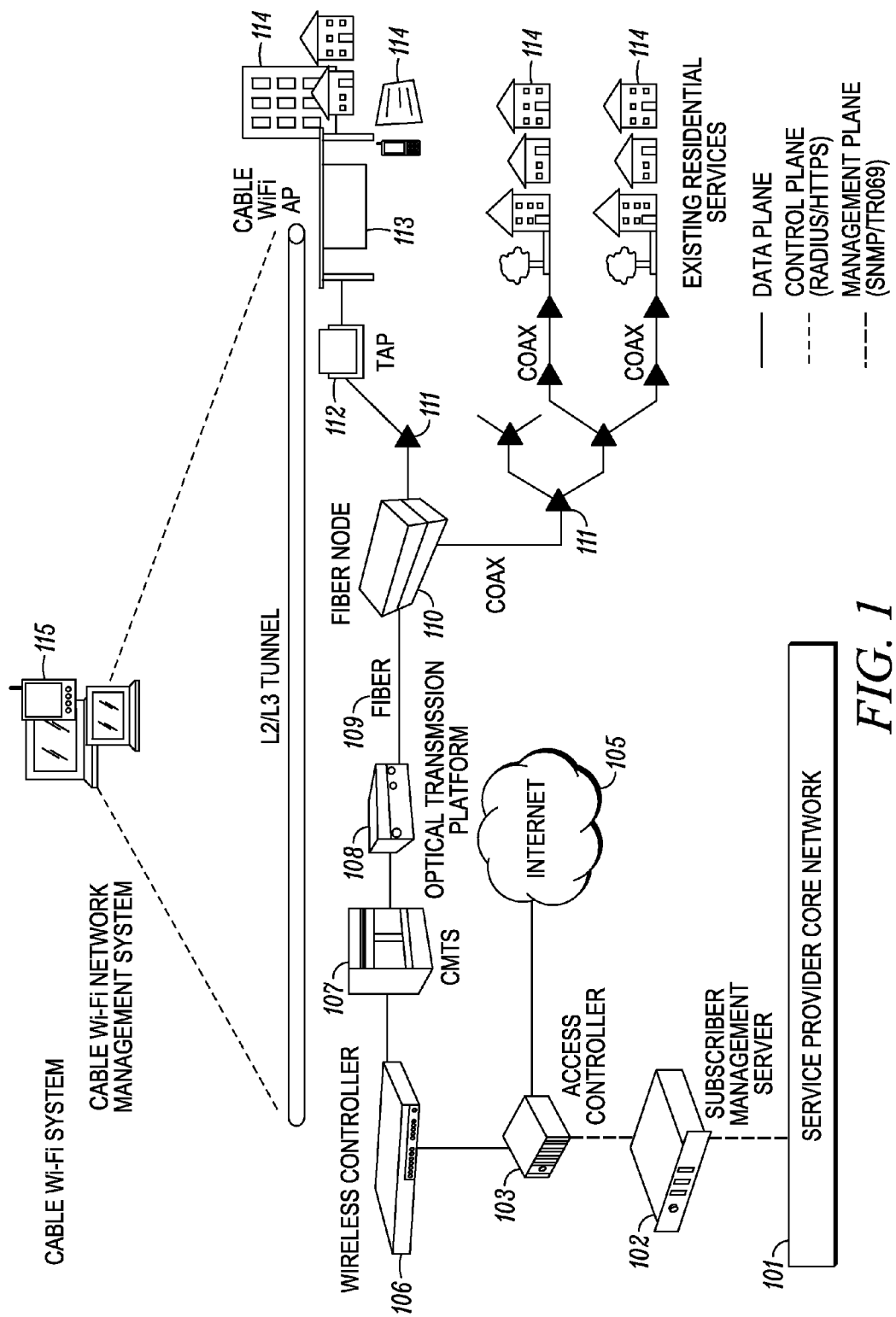
FIG. 1 depicts example cable Wi-Fi systems.
Figure 2:
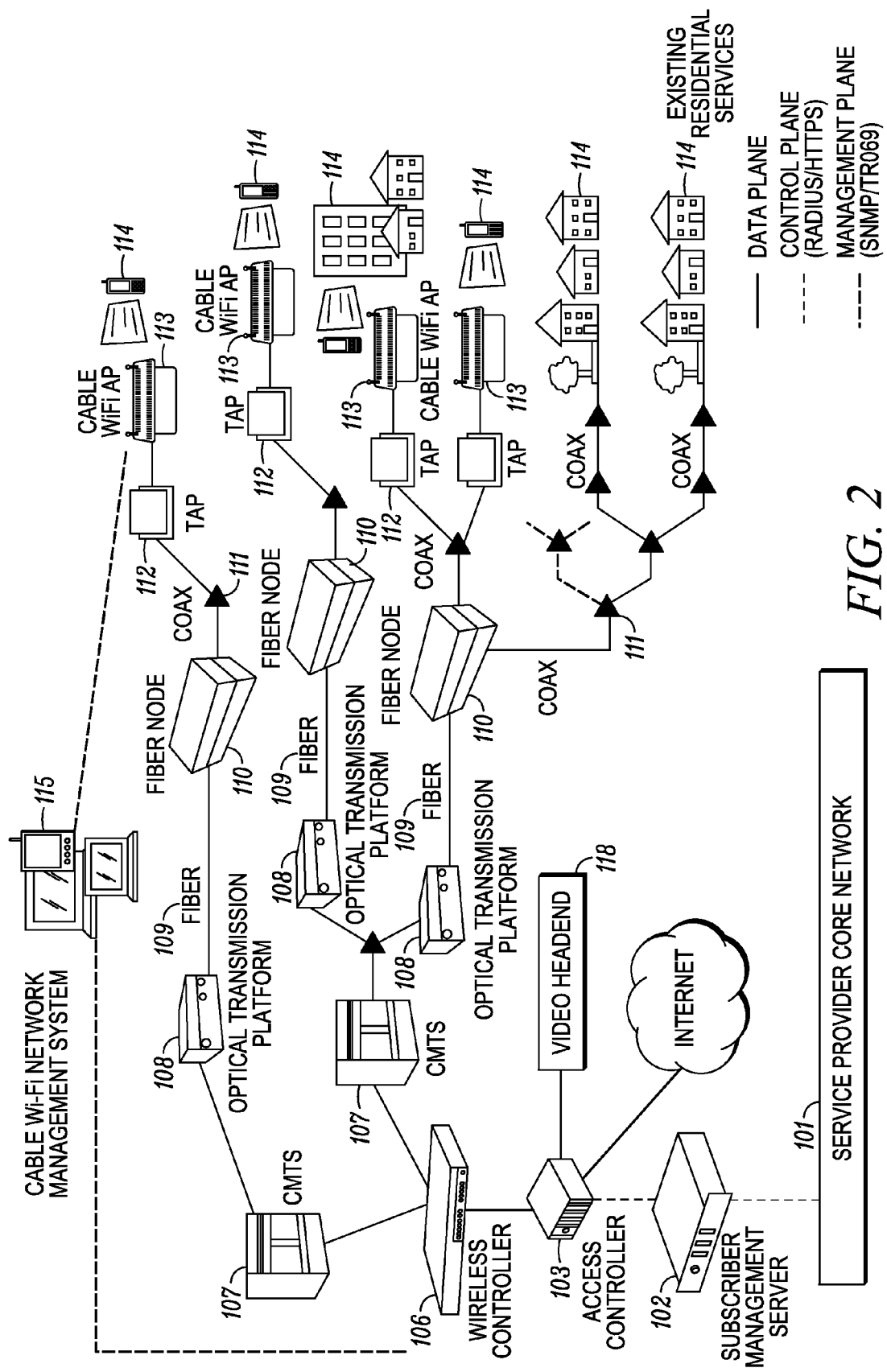
FIG. 2 depicts example cable Wi-Fi systems with integrated video control and management.

In existing cable Wi-Fi systems, cable and Wi-Fi segments are separate in terms of network and resource management, thus providing no end-to-end control for video. FIG. 1 and FIG. 2 depict example cable Wi-Fi systems.

FIGS. 1 and 2 depict a service provider core network 101 that communicates using various components to deliver content to a network element 114. A service and subscriber management server 102 and access controller 103 may be used for both subscribers and non-subscribers for service provisioning, authorization, billing and access control. Wireless controller 106 provision and manage access points and wireless links. Network elements 102, 103 and 106 may be implemented as appliances or software entities and may be combined in the same entity. Cable Wi-Fi network management system 115 is used for fault management, configuration, provisioning and business intelligence.

In the CMTS 107 path, the service provider's may use a communications network for processing and transmitting content to the provider's subscribers, such as a Hybrid Fiber Coax (HFC) network, or passive optical network (PON). Although the system is described for CMTS architecture, the functionality may be integrated into the next-generation architectures such as converged edge routers as an appliance or virtual entity. In the HFC network example shown in FIG. 1, the CMTS 107 delivers content to an optical broadband transmission platform 108. Over a fiber 109, the optical broadband transmission platform 108 delivers content to a node 110. The node may enable operators to independently and incrementally segment downstream and upstream paths over coaxial lines 111. The coaxial line may lead to a tap 112. Subscriber taps are tapped at various locations in the cable network to provide drop lines to subscribers and provide a return path for messages from subscribers. A tap is typically inserted in the coaxial cable at locations along a cable span where the transmitted signal can be provided to one or more subscribers via subscriber lines. Often the tap provides the final distribution of the CATV/RF signals to subscribers 114, typically via coaxial cables 111. The service may be for a residential/commercial building or outdoor service areas.

The cable Wi-Fi network management system 115 is used for fault management, configuration, provisioning and business intelligence. The cable Wi-Fi system may have its own cable wi-fi network management system separate from that of the HFC network, for example, and delivers content over a management plane to a cable Wi-Fi access point. A WiFi access point is a device that allows wireless devices to connect to a wired network using WiFi, or related standards. Access points may serve as a central transmitter/receiver of wireless radio signals, including Wi-Fi. Access points may support public Internet hotspots and extend a Wi-Fi signal range for private networks. The access point 113 may connect to a router via a wired network as a standalone device or integrated in to the router itself.

As shown in FIG. 2, a video headend system 118 is integrated into the control and management system of the cable Wi-Fi network. While current deployments are based on the architecture shown in FIG. 1 where cable, Wi-Fi and video management and control systems are separated, integrating video transport control and management with cable hetnet systems will enable higher quality video for Wi-Fi users. Video control and management may be regional/localized or can be integrated to the subscriber management system and core network as an appliance or software entity.

Services like carrier quality video require end-to-end control over heterogeneous networks which may be very different in nature in terms of resource dynamics. Therefore, end-to-end resource management is a challenge in terms of supporting high quality user experience while maximizing network utilization. Complexity is another issue as ideal resource management for cable Wi-Fi systems would require real time analysis and monitoring of Wi-Fi links, which is not feasible.

Disclosed herein are techniques that combine both network and client based approaches to enable a distributed and adaptive resource management system for carrier quality video transmission over cable Wi-Fi systems. Disclosed are mechanisms for call admission control and adaptive streaming based on adjustable resource margins and fairness indices for DOCSIS and Wi-Fi hetnet systems. Frameworks developed for network based adaptive steaming for VBR traffic over DOCSIS may not always track the performance related changes effectively when the system consists of highly variable links and distributed architecture. The disclosed techniques combine a network based adaptive streaming algorithm with wired and wireless information and takes in to account client device requests since previous network based control techniques do not have the best overall view. In cable Wi-Fi systems, for example, there are more dynamics involved because of bandwidth changes and changes at the wireless access point that is not visible to the cable network headend.

Today unmanaged video over cable Wi-Fi networks is controlled only by client based algorithms. Client based adaptive bit rate video applications are widely used, among them HTTP Live Streaming (Apple—HLS), Internet Information Services—Smooth Streaming (Microsoft—HSS), and HTTP Dynamic Streaming (Adobe—HDS) as de-facto industry standards, and MPEG Dynamic Adaptive Streaming over HTTP (MPEG-DASH) as the standardized adaptive streaming specification. While these protocols work better on dedicated mediums, they may create unfairness and misdiagnose the cause of a link problem (e.g., congestion vs. channel errors or channel access problems due to greedy users/applications). In shared mediums, end-user devices 114 cannot have the full network view; thus making differentiation of the problem much harder. On the other hand, the client based adaptive bit rate video applications are a good indicator when end-user is experiencing problems, which cannot be always detected in time by a network based controller.

For example, with a cable Wi-Fi component, a single user may have link problems (e.g., fading). Cable Wi-Fi may be a hot spot scenario with many users in the same medium, where a user has connection problems because not enough channel space due to the congestion. This is the tension between the individual link and congestion. The disclosed techniques consider not only network based control, but rate determination and user requests based on adaptive control algorithms. Instead of reducing multiple rates of one flow, for example, the network can recognize congestion based on client requests and make different adjustments, such as reducing the flow for many users to a smaller rate, or adjusting video quality for all flows sharing the same access point.

An issue is that DOCSIS based wired networks and Wi-Fi based wireless networks are very different in nature both in the PHY and MAC domains. Existing technologies that use bandwidth estimation (such as using packet pairs) between client and server do not address the fairness issue addressed in disclosed embodiments. This would create issues since the impact of a change in a flow on the other flows of the same category (e.g. serving area identified by an AP region) is not taken into account. Disclosed our techniques that may be governed by the interaction of flow transmissions.

In the unlicensed spectrum-shared medium of a Wi-Fi domain, users may have dramatically different link qualities based on their location and devices. Fairness algorithms have been developed to allow the users to share the air time in a fair way. However, these algorithms are based on low level layer information which does not adapt to user's video application requirements (e.g. bit rate per screen for a specific video), backhaul link conditions (such as DOCSIS network segment), user policy and device specific applications (such as client-based adaptive rate streaming). These algorithms may create even more unfairness for users as some users may backoff more while greedy users may use a preempted channel aggressively. The result is a wide range of end-user video quality for different devices and algorithms running on these devices.

For example, a first user with a certain client based adaptive rate algorithm may decrease its video rate while a second user with a different client based adaptive rate algorithm or a legacy device may not. The differentiation of the problem cause is not straightforward as either user may be at the edge of AP's coverage area or may be subject to a hidden node or other interference case. In another scenario, however, a first user may be subject to the same link conditions as other devices connected to the same wireless AP, but the first user's adaptive rate algorithm may be more proactive. Reducing the video rate of the first user without any other action may increase the wireless channel access and video rates of other users, resulting in more degradation and unfairness to the first user requesting the decrease.

In another example, a first user may ask for an increase of its rate but this may cause degradation and unfairness for other users on the path of shared heterogeneous networks. Therefore, client based rate adaptation algorithms may create unfairness, instability and low network utilization for cable Wi-Fi networks. On the other hand, as stated before, the client based rate adaptation algorithms are a good indicator of when an end-user is experiencing problems. The end-user's problems may not be always detectable by the central system due to it being infeasible for a central system to have each bi-directional link status in any point over time for a Wi-Fi system.

The issues described above are aggravated if video is VBR. While constant bit rate (CBR) type video transmission increases the network utilization, CBR is not flexible in terms of quality provision for video dynamics. On the other hand, VBR type video transmissions can support high quality for videos with high peak-to-average bit rates but with lower network utilization. If an adaptive rate algorithm can use overall network information, the adaptive rate algorithm may enable VBR video transmission over DOCSIS networks by ensuring a minimum quality while maximizing network utilization. However, in heterogeneous networks such as cable Wi-Fi networks, the challenge is to have an accurate view of the network in a timely manner and differentiate location and device specific issues. Although 802.11k type standards aim to provide access points with more measurement capability with station assisted probing, having link, mobility and device specific issues at a central resource manager is not always feasible.

Disclosed herein are techniques that use a distributed and adaptive resource management system that is assisted with client based adaptive rate algorithms for carrier quality video transmission over cable Wi-Fi systems.

Native VBR and capped-VBR stream transmissions and their effect on the last-mile Internet Protocol (IP) link have been evaluated. CBR services can be statically multiplexed with precise bandwidth allocation and can therefore be easily traffic engineered into any DOCSIS IP pipe, whether bonded or unbonded. VBR services, on the other hand, should be evaluated for their statistical properties so the services can be mathematically analyzed prior to grouping them into a specific IP pipe, without additional MPEG processing. Due to the impact of network and traffic parameters on a system performance for VBR multiplexing, a soft admission control algorithm with network based rate adaptation is proposed. The proposed system may be implemented over IP based DOCSIS transport networks as well as IP based gateway systems.

It has been found that network based control systems alone for high dynamic networks such as wireless networks are not adequate due to the fact that the bidirectional links vary based on time, location and link direction, and accurate measurements of these links are not feasible for all times. Also, access points in a shared medium may not measure the interference outside of their range but rather only in their serving stations' range.

Recent advances in Wi-Fi systems (e.g., high throughput systems (802.11n, 802.11ac-ad), Wi-Fi Alliance Admission Control specification, 802.11k type measurement and reporting protocols, 802.11a for Video over Wi-Fi, etc) enable better performance for video services. Note that these frameworks are complementary to the disclosed techniques. For example, an Admission Control specification specifies an interoperable way to implement admission control but does not specify how decisions to accept/reject are made or how allocated resources are changed.

Conventional methods for bandwidth estimations that address thinning raw scalable media packets to adapt them to user requests perform a bandwidth estimation to assess network conditions via well-known methods such as Packet-Pair concept or RTP control protocol. In these techniques, thinning is performed based on the estimation. However, the conventional methods do not work well for heterogeneous networks such as cable Wi-Fi systems.

Disclosed are techniques for a distributed and adaptive resource management system that is assisted with client based adaptive rate algorithms for carrier quality video transmission over cable Wi-Fi systems. As will be further described below, disclosed our techniques for combining network based adaptive streaming with client based adaptive streaming algorithms. In embodiments, an objective is to make sure video is transmitted at acceptable levels of performance (e.g., rate) that may be dependent on video complexity, device/screen type, user profile etc. Highest performance is targeted while acceptable levels and time percentages of lower performance (e.g., rate) are to increase the network utilization and fairness.

Figure 3:
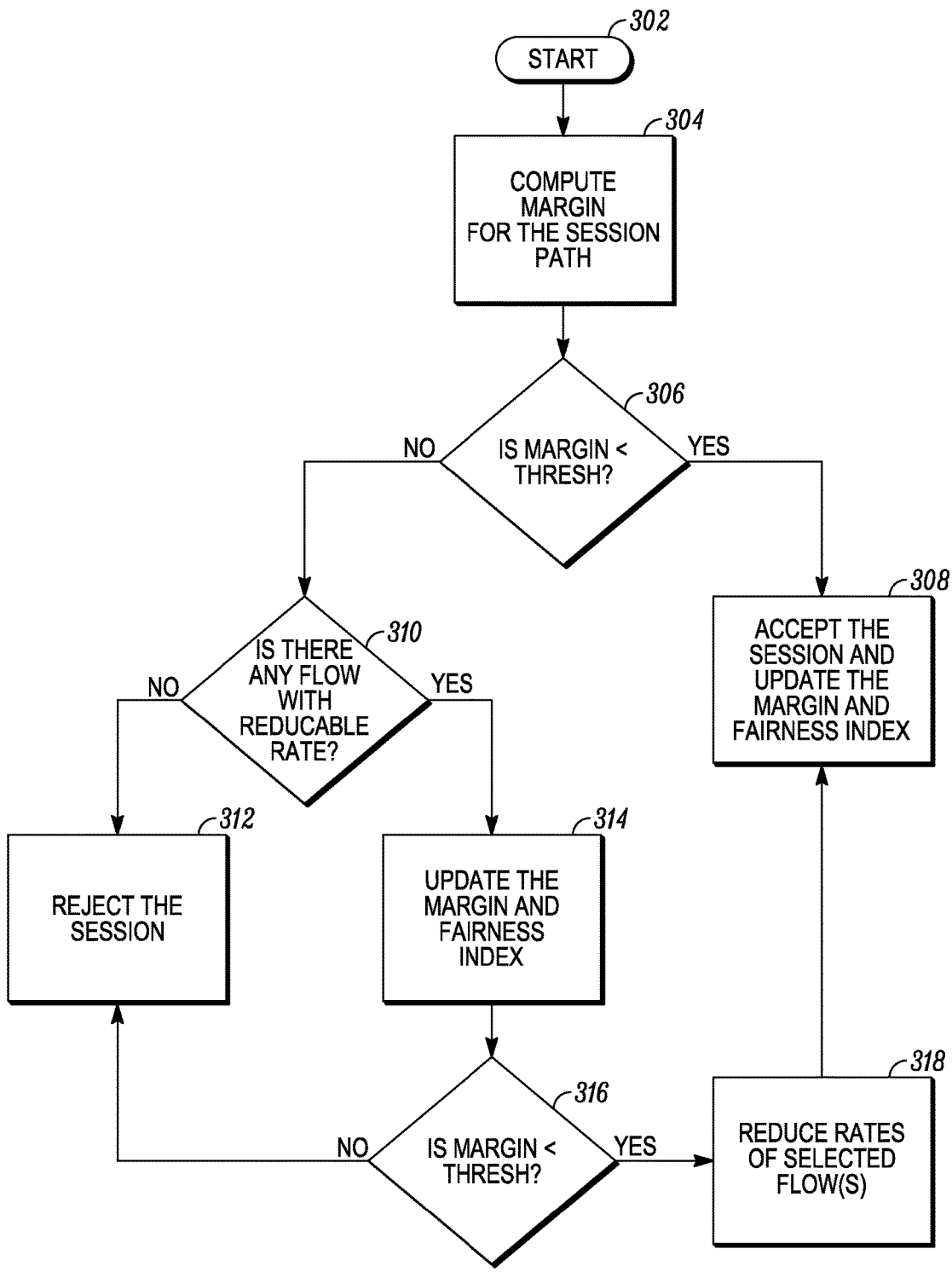
FIG. 3 depicts a flow diagram for admission control including whether to reduce rates of selected flows based on a margin computation.
Figure 4:
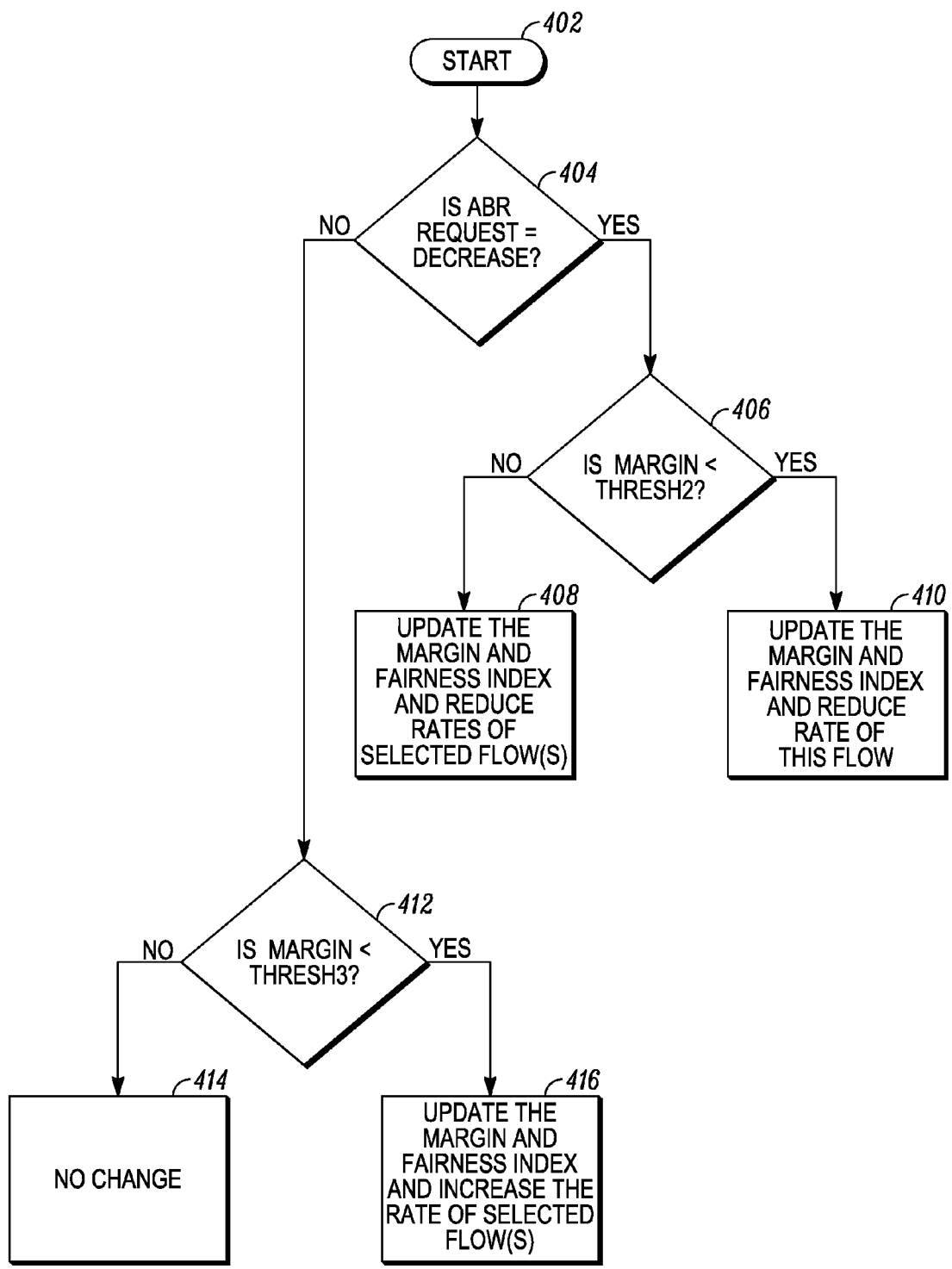
FIG. 4 depicts an example flow diagram for network based control of an adaptive bit rate request.
Figure 5:
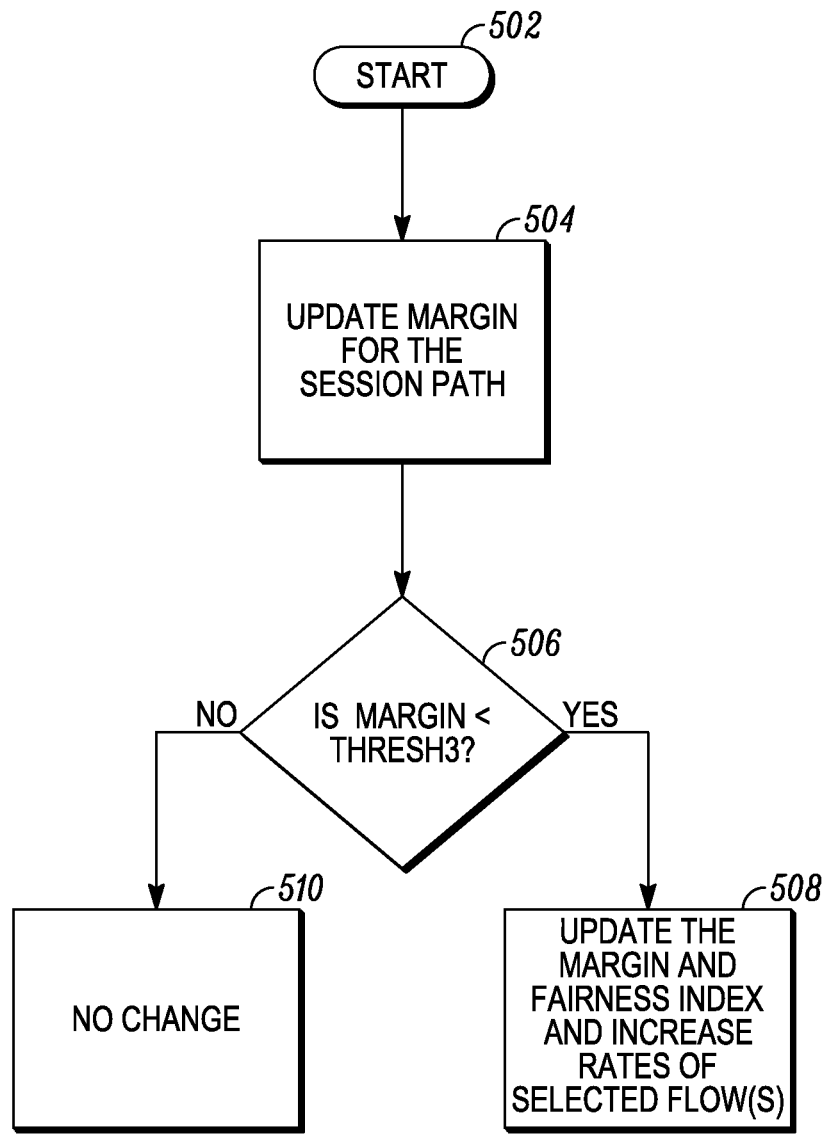
FIG. 5 depicts a flow diagram for a session end algorithm.

FIGS. 3-5 display example algorithms for the disclosed adaptive resource management system. System components or a device may be configured to perform the algorithms defined in FIGS. 3-5. In embodiments, call admission control is integrated with adaptive resource management. If a new managed video flow service is requested, call admission control algorithm will assess the resources and the new video requirements to decide if the flow should be accepted or rejected. The decision is based on margins (resource margins) and an application fairness index. The decision may be taken after resetting the resources (e.g. reducing rates of other existing flows).

The fairnes index is based on the ratio of received quality over a history window of a single flow to the received quality over a history window of all flows sharing the same network resources. The received quality may be an index based on the actual and required quality metric. This metric may be based on throughput, delay and jitter values. "Actual" refers for example to the assigned rate based on the allocated resources while "required" refers to the rate needed to meet quality requirements of the flow.

The margin is a function of network resources that can be expressed in terms of bandwidth, rate or delay. An estimated network resource is assumed to be the network conditions for a given time interval. Margin thresholds are limits computed based on traffic and network conditions and requirements. For example, if video requirements of all existing flows (or maximum number of flows) change between [R1,R2] and network resources fluctuate between [N1,N2] than the threshold may be computed based on the difference of R2 and N1 to take into account the worst case. Additional margin may be added for estimated fluctuations in the near future of the network. As explained below, client based feedback may update both margin and margin thresholds.

FIG. 3 depicts a flow diagram for admission control (CA) including whether to reduce rates of selected flows based on a margin computation, with the start of the flow diagram represented by 302. At 304, a margin is computed for the session path. A margin is computed based on resource measurement at a cable modem termination system (CMTS) and corresponding access points (AP) through a central session manager (to include traffic variations, link dynamics and mobility). The margin may be defined per serving area, network path or other profiles. As described in more detail below, the margin may be computed in terms of delay bound or rate.

At 306, the computed margin is compared to a margin threshold. Different margin thresholds may be set for AC and ABR requests. Due to fluctuations in the network conditions the resources may change over time. Furthermore, if linear VBR IP video is transmitted the video requirements may change over different sections of the flow depending on the content. Therefore, the margin thresholds should take into account these fluctuations. For example, if the system bandwidth is determined as BW_S and the fluctuations are expected as 10% then the margin threshold should be more than 10% of the BW_S.

While a margin is a computation for the whole network usage, an application fairness index is identified for a particular video flow that is also affected by other flows in the group. In embodiments, the application fairness index is normalized by a corresponding rate requirement based on a Video Quality Requirement (VQ) index. The application fairness index may be based on an assumption that the VQ index includes an end user policy and device/screen requirements. The application fairness index may be updated based on usage history. It is noted that air time fairness is a term related to IEEE 802.11 medium time/admitted time definitions in Wi-Fi Alliance specification, while application fairness defines a ratio of medium usage and the VQ Requirement Index. For example, the application fairness may take into account normalization of VQ indices achieved vs. requested per flow groups.

In embodiments, the application fairness index is computed based on cooperative game theory approach. For example, in case of congestion within an AP zone, lowering the rate of multiple flows to next rate level may be better than lowering one or a few flows' rate to the lowest rate level. This increases video quality since there is no sharp change and also stability. The application fairness index corresponds to the same margin group.

If at 306 the margin is less than a margin threshold, at 308 the session is accepted and the margin and an application fairness index are updated. If at 306 it is determined that the margin computed is greater than the margin threshold, the algorithm identifies whether there are any flows with reducible rate. If there is not, the session is rejected at 312. If there are one or more flows with reducible rate, the margin and fairness index are updated at 314. Thus, the margin may be updated based on client based ABR requests. The update based on client-based ABR requests helps to react to end-user device and/or link problems that are not detected by central session manager.

At 316, the determination is made again whether the margin, updated at 314, is less than a margin threshold. If it is not less than the threshold, the session is rejected at 312. Else, at 318, the rates of selected flows are reduced and at 308 the session is accepted and the fairness index is updated.

In embodiments, the flow selection for the rate adjustment varies based on multiple service operator (MSO)'s rate requirements, per user and per device. In embodiments, each flow has an application fairness index updated based on history. The flow selection may be based on maximum and minimum limits (for traffic and VQ index). Further, flow selection may determine unicast to multicast transitions. For example, slow links may result in a longer medium time, which may affect both the user and others in the AP range.

FIG. 4 depicts an example flow diagram for network based control of an adaptive bit rate request, with the start of the flow diagram represented by 402. At 404, the algorithm determines an adaptive bit rate request includes a request to reduce or decrease the bit rate of a particular flow, now the flow under analysis. If the adaptive bit rate request does include a request to reduce or decrease the bit rate, at 406 the analysis is whether the margin is smaller than a first threshold, e.g., Thresh2. The margin may be computed, as described with respect to FIG. 3. If the margin is smaller than the margin threshold value, then at 410 the margin and fairness index is updated and the rate for the flow under analysis. If the margin is not smaller than the margin threshold value, at 408 the margin and fairness index of updated and the rate of selected flows are reduced. The selected flows may or may not include the flow under analysis. For example, if a flow problem results due to congestion, and if the network controller decides the problem is due to the congestion, the system may choose to lower the rates of other flows that have higher fairness indices.

If it is determined at 404 that the adaptive bit rate request does not include a request to reduce or decrease the bit rate, at 412 the determination is whether the margin is smaller than a second threshold value, e.g., Thresh3. It is noted that values THRES2 and THRESH3 may be the same such that the system can conservatively increase rates. If the margin is smaller than the threshold value, then at 416 the margin and fairness index are updated and the rate of selected flows are increased. The flows may be ordered based on their fairness index that takes into account their requirements and their service rate history compared to other flows in the system. The rates are then increased to make the overall fairness optimal. User requests for rate increase that were not fulfilled may be also taken into consideration based on moving average values of the network resource and individual flow conditions. If the margin is not smaller than the threshold at 412, no change is made to the margin or fairness index, represented by 414.

FIG. 5 depicts a flow diagram for a session end algorithm, with the start of the flow diagram represented by 502. At 504, the margin is updated for a session path. For example, in FIG. 3 the margin may be updated at 308 or 314 and in FIG. 4 the margin may be updated at 408, 410, and 416, for example. If the updated margin is less than a threshold value, e.g., Thresh3, then the margin and fairness index is updated at 508 and the rates of the selected flows are increased. Flows may be selected based on their fairness index order as discussed in the previous section. If the margin is not less than the threshold value at 506, then there is no change to the margin and fairness index, as represented by 510.

Described above are embodiments by which a client based ABR request is used to correct network based bandwidth estimations. In contrast, conventional individual bandwidth estimation is performed between a client and network controller (such as using Packet Pair concept or other bandwidth estimation methods), and cannot confirm if the measured bandwidth is the actual channel bandwidth that should be allocated to the user in Wi-Fi networks.

The disclosed techniques factor in that shared air spectrum fairness is affected by many factors, including the interaction of algorithms at different layers (e.g. congestion control mechanisms at 802.11 MAC, TCP and HTTP streaming algorithm levels). In embodiments, an application level fairness index is used based on grouping users sharing the same network path and users actions (e.g. ABR requests). Based on the application fairness index and decision margins, one user's request may change not only its bandwidth estimation or other conditions, but may change those of other users' in the same group as well.

The use of the application fairness index assists in distinguishing individual link problems (such as fading or hidden node problems) vs. congestion (high traffic usage) in the Wi-Fi zone. For example, if the network controller starts getting rate decrease requests from multiple users associated with the same AP, by correlating to network bandwidth estimation (margins), the network controller may state the situation as congestion (due to APs traffic or other traffic from overlapping APs) and may choose to lower other users' flow rates as well proactively based on video and device requirements. Lowering multiple Wi-Fi users' flow rates during congestion at one rate below for example may help to reduce negative impact as eye may adapt better to one lower rate compared to lower only few users' rate to a minimum rate.

Further the disclosed techniques address stability and network utilization issues. For example, if a user has individual link problems (e.g. user requests rate decrease while the corresponding margin is high and other users sharing the same AP do not request rate decrease), the fairness index and margins may be updated not to slow down any other user but also to make sure the user with individual link problems can get more bandwidth share once its conditions improve. Margins help to keep greedy users getting all available bandwidth to a point other users can't increase their rate due to backoff algorithms used at MAC and TCP levels.

It is noted that while FIGS. 3-5 depict embodiments for the disclosed techniques, the algorithms may vary or include other options than that is what is shown. For example, in FIG. 4, a client ABR request to decrease a flow rate may result in decreasing rates of other flows based on the margin. There may be multiple decrease requests from different users in a specific time window (showing a general congestion/interference increase in AP region).

As described in more detail below, various information from the network(s) may influence the adaptive resource management of the flows, such as traffic information, resource information, or other metrics. Traffic information for video on demand applications, for example, may include the video on demand peak rates vs. time (e.g., trick play). For live play, the traffic information may include peak rates for each x seconds ahead the live stream is playing. Resource information may include margins from a CMTS or access points, feedback from an end-user device regarding its resources, etc. Other metrics that may be included in the adaptive resource management include margins or application fairness index, as described above, or other metrics such as the rate ranges corresponding to VQ Index Z.

Although the examples above are described with respect to cable Wi-Fi networks, it would be understood by one of skill in the art that the disclosed techniques can apply to other network architectures as well, such as fiber, cellular, Wi-Max networks.

Figure 6:
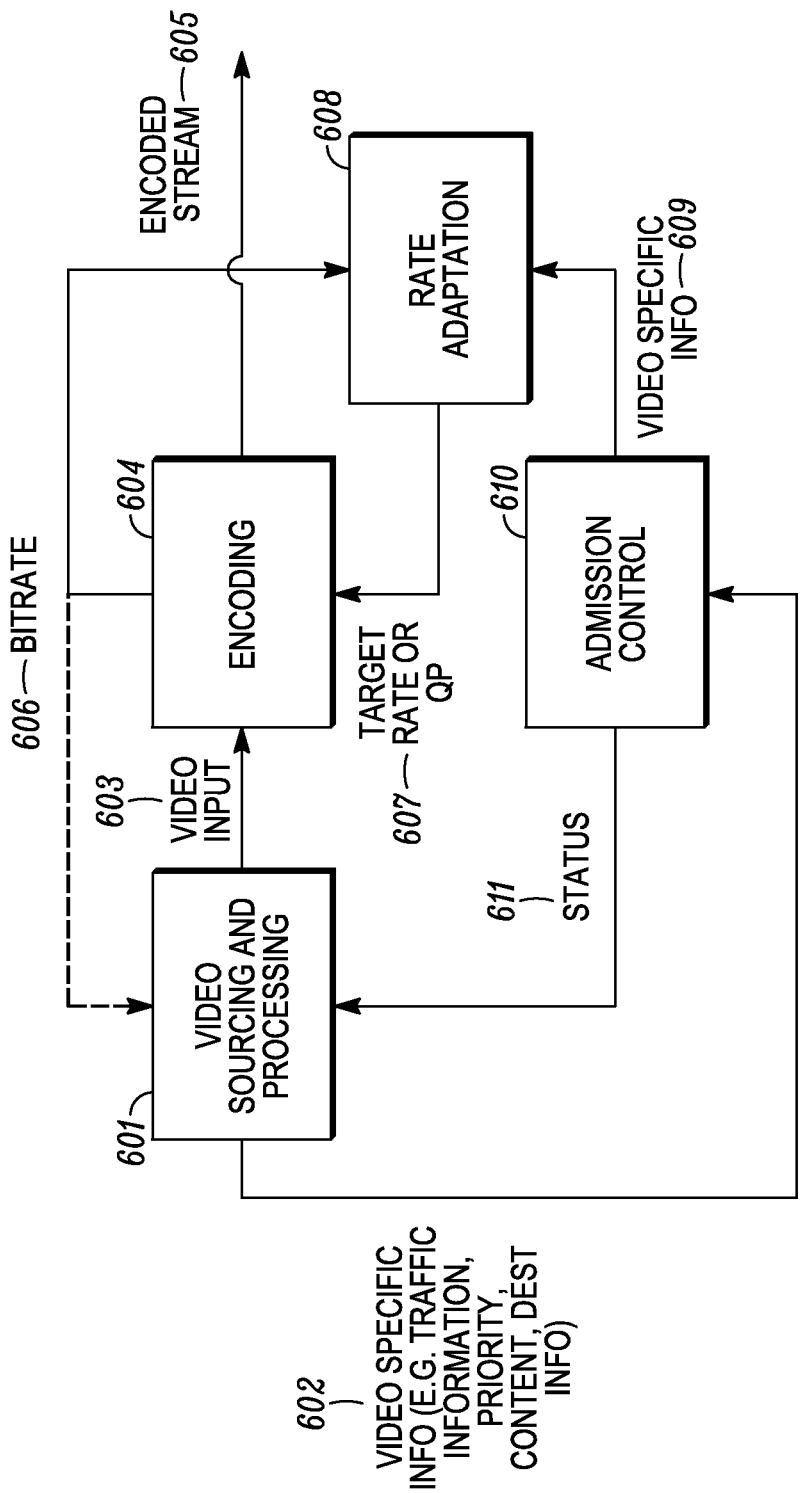
FIG. 6 depicts details of an example system architecture configured to implement the disclosed techniques.
Figure 7:
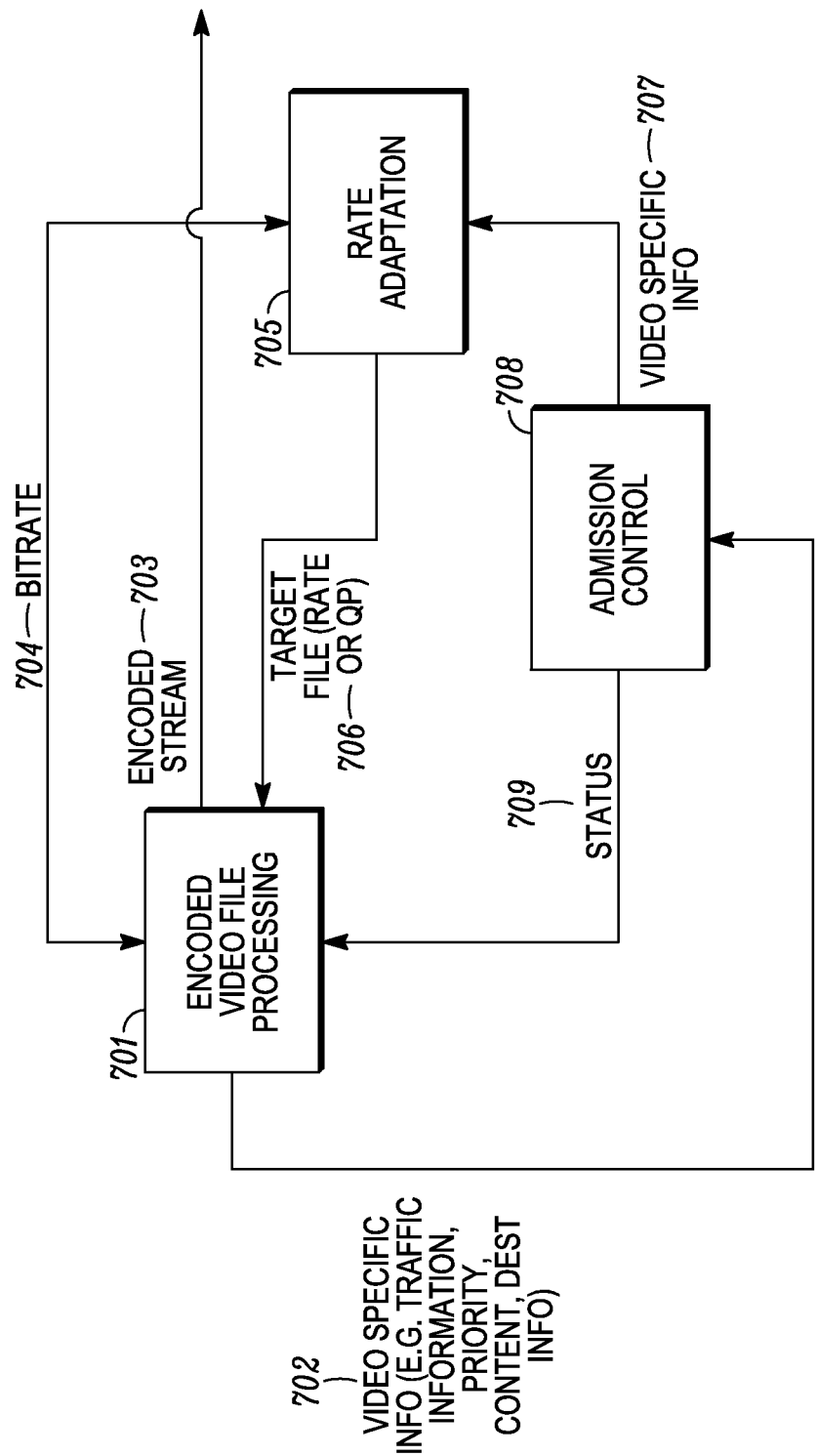
FIG. 7 depicts details of another example system architecture configured to implement the disclosed techniques.

FIGS. 6 and 7 depict details of system architectures configured to implement the disclosed techniques. As shown, traffic control modules include admission control blocks 610, 708 and rate adaptation blocks 608, 705. In these examples, each new video is defined as a flow.

In FIG. 6, the video input 603 to encoding block 606 may originate with the video source and processing module 601. The video input 603 may be encoded at encoding block 604. The flow of a particular bit rate is provided to a rate adaptation module 608, which provides a target rate or QP back to the encoding block 604. The video source and processing module 601 also provides flow characteristics (traffic, content, target QoS information, network path, etc) to the admission control block 610. The admission control block 610 provides a status 611 to the video source and processing module 601 and may also provide video specific info 609 to the rate adaptation module 608. The output from the encoder 604 is an encoded stream utilizing the information from the admission control and rate adaptation modules 610, 608, respectively.

As shown in FIG. 7, a different architecture is shown where the encoded video file processing module 701 outputs an encoded stream 703, provides a flow with a particular bitrate 704 to the rate adaptation module 705, and provides flow characteristics 702 (traffic, content, target QoS information, network path, etc) to the admission control module 708. The admission control block 708 provides a status 709 to the encoded video file processing module 701 and may also provide video specific info 707 to the rate adaptation module 705. The output from the encoded video file processing module 701 may be adjusted based on the target file (rate or QP) information 706 from the rate adaptation module 705 and status information 709 from the admission control module 708.

The admission control modules 610, 708 estimate the probability for each flow to exceed a delay bound. A new flow or bandwidth/resource changes may change the delay probabilities of existing flows. If the final probabilities for each flow are within the acceptable range, the new flow is accepted, otherwise the flow is rejected as explained per the algorithm of FIG. 3. A renegotiation with new traffic and QoS information may be acceptable for some use cases The rate adaptation modules 608, 705 get a priori traffic information for a predetermined time interval (e.g., next 2 seconds) and computes delay bounds for each flow. If a delay bound for a flow is exceeded, a new capping rate (see FIG. 8) or a new chunk file (see FIG. 9) is requested. The functionalities of traffic control modules are explained in more detail below.

Note that the function blocks shown in FIGS. 6 and 7 may be implemented within video processing components such as resource and session manager, packager and edge streaming servers.

Described below are various embodiments for implementing the disclosed techniques. Although the embodiments describe a round robin scheduler, it should be understood by one of skill in the art that other schedulers, such as weighted fair queuing, may be used as well.

A CMTS may include a downstream scheduler. Admission control and rate adaptation modules, such as 610, 708, 608, and 705 in FIGS. 6 and 7, may be based on a delay bound computation of a DOCSIS downstream scheduler. In embodiments, the downstream scheduler is based on Hierarchical Prioritized Round Robin (HPRR) scheduler. Each packet is assigned to a service flow based on its traffic specifications. Each flow is considered to be a member of a single service class, which describes a set of data forwarding services provided to flows. For purposes of example, assume service classes of voice, video, high speed data (HSD) with high priority and HSD with best effort traffic. The management packets are sent immediately when the channel is ready to transmit.

Packets are first subject to a token bucket limiter defined by Maximum Sustained Traffic Rate (MSTR) and Maximum Traffic Burst (MTB) of their flows. If the new packet exceeds the allowed burst rate, it is delayed until enough token is accumulated or dropped if overflow occurs and time-to-live (TTL) is exceeded. The packets that pass their maximum rate token bucket limiter are forwarded in either of two classes: the flow's configured class if they pass another token bucket limiter defined by the flow's Minimum Reserved Rate (MRR) or the default class otherwise. Therefore, the HPRR method allows a packet from a flow to be forwarded either as part of the bandwidth allocated to its service class or as part of the best effort bandwidth allocated to the default class. This feature enables flows of an overbooked class to be still served through the default class.

Flows in the same class are forwarded to the virtual per-class queue by using Deficit Round Robin scheduling where quanta are based on their MRR or MSR if their MRR is zero. When the channel is available for transmission, virtual per-class queues are serviced in their scheduling priority order, using another Deficit Round Robin algorithm where higher priority class is serviced until its quantum runs out. A class' quantum is based on a Maximum Assigned Bandwidth (MAB) that determines amount of channel bandwidth reserved for the class. The ratio of class quanta is proportional to the ratio of MABs, summing to a total quantum value (e.g. 50 k bytes).

Configured Active Percent (CAP) parameters define the percentage of the flows that are expected to be simultaneously active. The flows are admitted such that the CAP percentage times the sum of the admitted flows' MRRs is less than the MAB percentage of capacity allocated for the class on the channel. If at any time more than the expected number of active flows is actually active, the class becomes overbooked. In this case, flows in this class may receive less than their minimum reserved rate but also serviced through default class. Guaranteed services such as voice are set with zero overbooking (i.e. CAP=100%) while best effort services are set with infinite overbooking (i.e. CAP=0%).

The disclosed techniques may be used in a DOCSIS network. For example, margin estimations can be done per delay bound computations that are validated through simulations. MSTR, MTB, MRR and traffic priorities are DOCSIS service flow parameters, while MAB, CAP, scheduling priority may be proprietary parameters. DOCSIS service flow parameters are mapped from RSVP flowspec parameters with recommendations given or by using parameters such as DSCP codes when flows are first activated. A flow reservation is deactivated if there is no activity within the activity timeout value.

Packets that exceed the capacity of flow transmit buffers at the CMTS are dropped. Packets of services such as voice and video are received by the CMs at the receiver buffers modeled with buffering delays to drop packets with higher delays.

A delay bound computation is done based on a priori traffic information and resource estimation. Resource estimation is determined by the network resources (e.g. available bandwidth) and network processing components (e.g. schedulers). Bandwidth is estimated per window size, is assumed constant during this window size (until new information changes the estimation). Delay bound computation for the scheduler is defined in more detail below.

Latency-rate servers are introduced where delay bound computations are explained for DRR schedulers. Correcting error may be done with computations having the same derivation on DRR delay bound based on latency-rate server definition.

Improving upon conventional techniques, the disclosed implementation of a DRR scheduler adjusted for MPEG encoded frames is done in terms of a smallest entity that can be served in a transmission attempt. In the disclosed embodiments, for example, IP packets (encapsulated Mpeg-2 TS packets) are smallest entities while a burst is defined as the summation of IP packets within the same round time. The implementation assumes frame boundaries within a burst are known to make sure complexity is not increased. Therefore the maximum deficit after a round can be (IP packet size −1).

Figure 8:
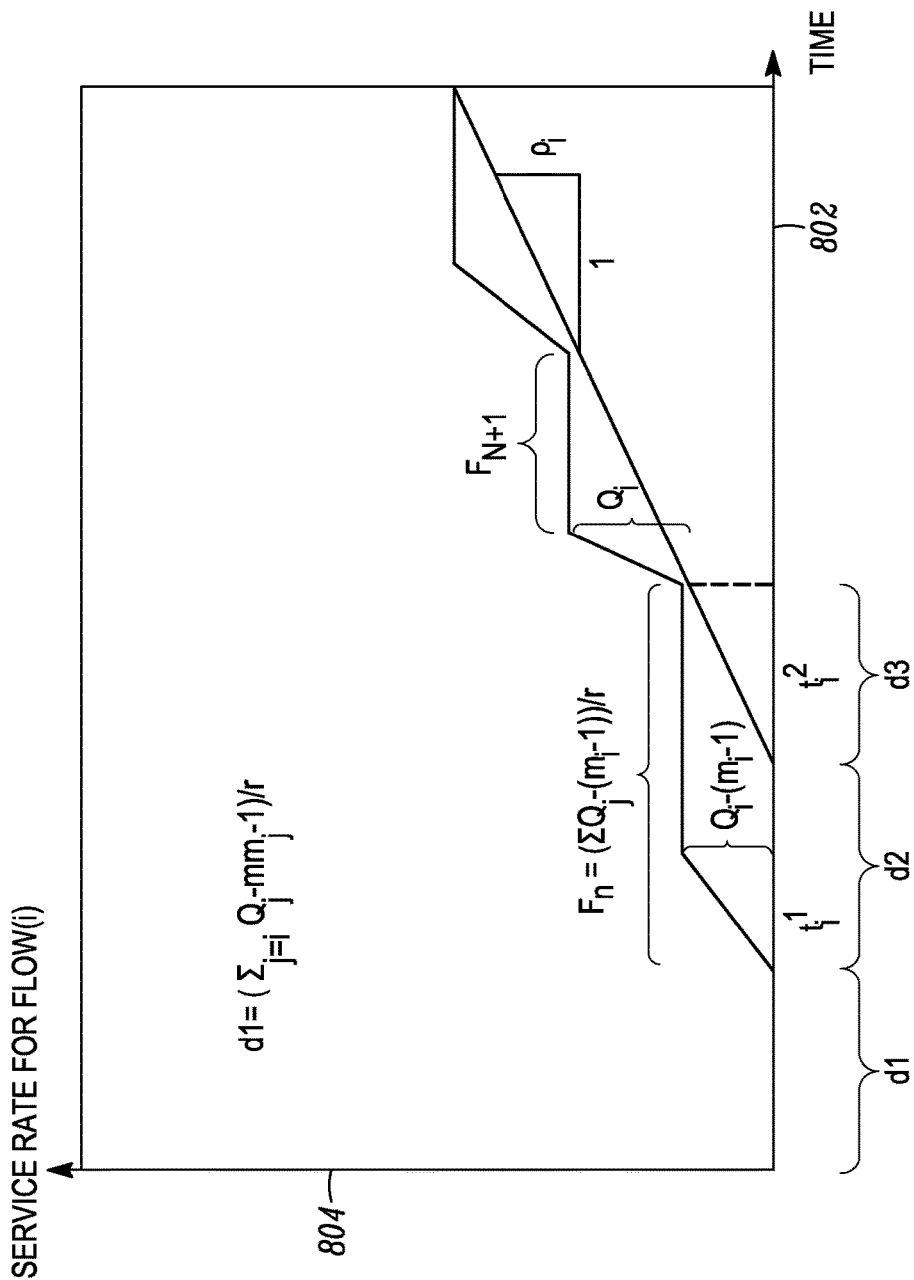
FIG. 8 depicts a graphical derivation of a delay bound for a modified Deficit Round Robin scheduling algorithm.

If the flows have service proportional to their minimum reserved rates and the sum of the reserved rates does not exceed the link rate, the delay bound for the modified DRR can be computed based on a latency-rate server definition: the latency of a guaranteed rate scheduler is the measure of the cumulative time that a flow has to wait until it begins receiving service at its guaranteed rate The following parameters define the DRR scheduling system:

$w_i$=weigth for flow i ($\Sigma w_i=W$)
$Q_i$=quantum for flow i=$w_i*Q_{min}$
$DC_i$=deficit for flow i
$m_i$=maximum burst size for flow i
$mm_i$=maximum packet size for flow i
$F_n$=DRR round size at round n The modified DRR system has the following definitions:
$0 \leq DC_i(n-1) \leq mm_i-1$
$0 \leq DC'_i(n) \leq m_i-1$
$\Sigma \rho_i \leq r$ ($\rho_i$=reserved rate for flow i, r=link rate)
$Sent_i(n)=w_i*Q_{min}+DC_i(n-1)-DC'_i(n)$ FIG. 8 depicts a graphical derivation of a delay bound for a modified DRR, where the x-axis represents time and the y-axis represents the service rate for a flow(i). The derivation for the max delay for flow(i) is depicted graphically in FIG. 8. By using derivation the max_delay can be shown as:

$Sent_i(t_i,t_{ik}) \geq \max\{0, \rho_i (t_{ik}-t_i-1/r(F-Q_i)+\Sigma_{j \neq i}(mm_j-1)+(F/Q_i-1)*(m_i-1)))\}$ $max\_delay=1/r(F-Q_i)+\Sigma_{j \neq i}(mm_j-1)+(F/Q_i-1)*(m_i-1)$, where max_delay is the delay bound for the modified DRR The derivation shown in FIG. 8 demonstrates an example of the disclosed techniques used in a BSR CMTS scheduler to estimate delay bounds, that may be used for margin estimations. Note that the latency of a guaranteed rate scheduler is the measure of the cumulative time that a flow has to wait until it begins receiving service at its guaranteed rate. By using similar triangles (where service rates are initial rate and guaranteed rate), it can be shown that max_delay=d1+d2 is the same as derived above.

Note that this derivation is also valid when guaranteed rates are not exceeded. Therefore, depending on the traffic characteristics, admission control based on the derived delay bound may yield conservative decisions thereby causing low utilization.

If the traffic characteristics are known in a more accurate way, the utilization may be increased (at the expense of having a more complex implementation of admission control). For instance, if frame sizes are known for given time intervals, a deterministic traffic model may be used. The maximum utilization still depends on the timing of scheduler and the interval of traffic constraint functions. Furthermore, trick mode plays may change traffic time intervals, hence overlapped peak areas. Therefore, below we show that statistical admission control with rate adaptation may cover more use cases where delay bounds can be guaranteed for given rate conditions. For example, a user may require 90% of time a premium rate while 9% of time a lower rate and 1% of time a lowest rate may provide the QoE the service provider aims.

In embodiments, a statistical admission control with rate adaptation based on our scheduler is considered. As explained above, the tradeoff between synchronization of video flows with the traffic control module and the implementation complexity defines the network utilization and user QoE. As disclosed, the algorithms can be adjusted based on the traffic information and system timing. Described below is an example computation where it is assumed that traffic information is known as video frame sizes with corresponding video fame interval, and a bounded jitter is assumed between the traffic control module and video source.

As the basis of queuing theory, if $A_j[s,\tau]$ is the arrival size of flow j at time interval $[s,\tau]$ and $S_j[s,\tau]$ is the service it received during this time (S is the departure rate shown in FIG. 8), the queue size is:

$$q_j(\tau) = \max_{s<\tau}\left\{\sum_{j=1}^{N} A_j[s,\tau] - S_j[s,\tau]\right\}$$

Assume that traffic information A is known for every flow j in a given time interval. The service time of each flow j during that time depends on the scheduler. The characteristics of our scheduler considered in the example can be summarized as:

Flows are regulated through Max and Traffic rate limitations

A flow Quantum Size is predetermined.

A single class case (no dependency on inter-class parameters) is assumed (Note that multiple classes can be incorporated based on priorities and class quantum values.)

Minimum reserved rates may be exceeded.

One round time is determined by the total number of bytes of active flows (queued from previous rounds+new arrival)

Multiple packets may arrive for a flow between round visits (queued bytes+new arrival may exceed quantum size)—(note this is related to D-bind traffic characterization and frame statistics within GOP structure)

Maximum delay for a flow arrival is determined by the queue size of the corresponding flow and new arrivals. If the total size is higher than quantum size, the last packet of the new arrival will be transmitted after the number of round times where the total quantum size is equal to previous queue size+new arrival size. Maximum one round time is determined by the number of active flows times the quantum size+IP packet size divided by the link rate.

The packets that exceed flow quantum size for the corresponding priority class, may be transmitted through default queue. Then the delay is determined by the same delay computation applied for default queue parameters. Note that this helps to reduce delays for bursts exceeding the flow quantum size while increases delays for less bursty traffic (adjustable by the flow parameters).

Figure 9:
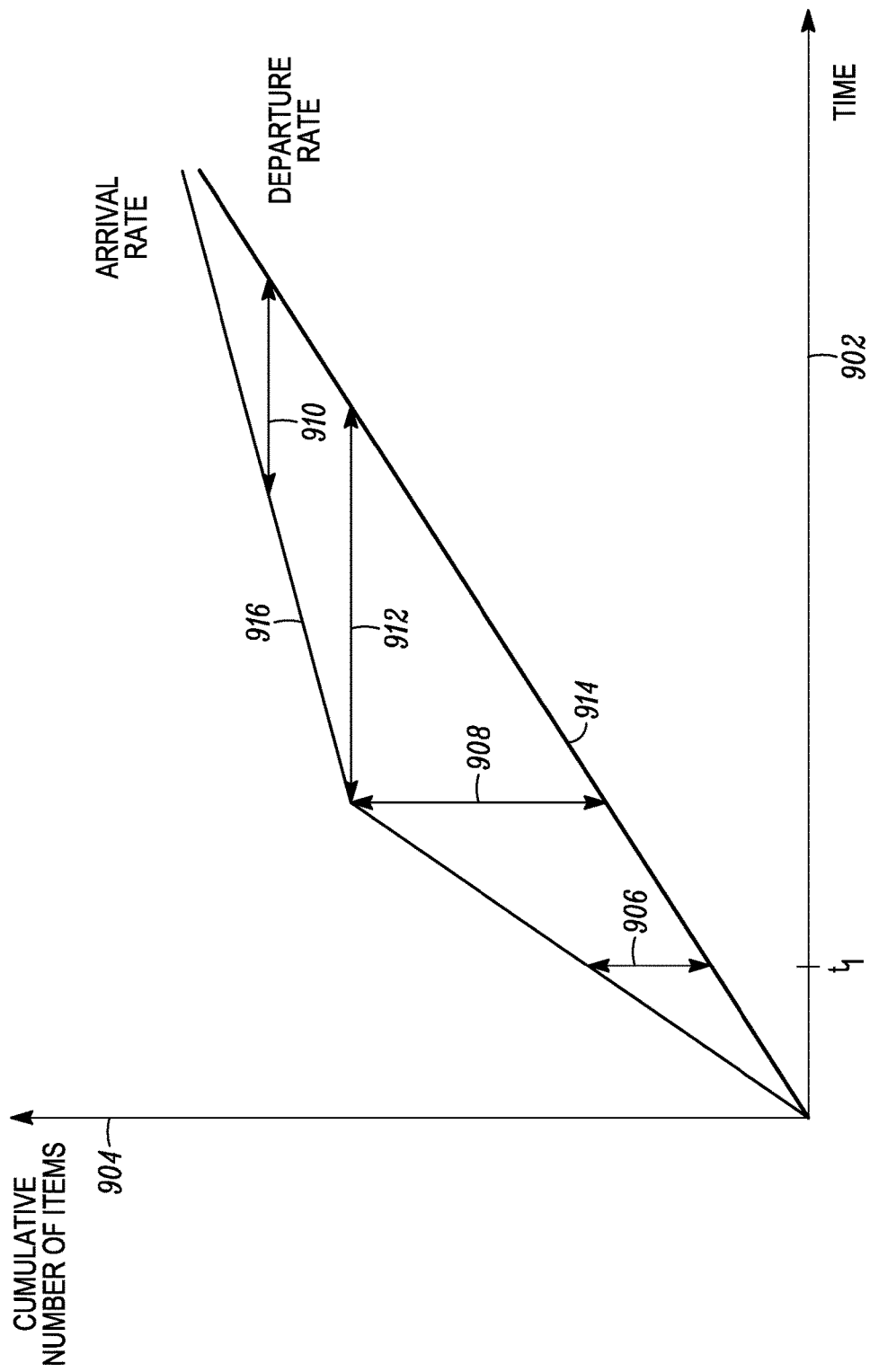
FIG. 9 illustrates queuing behavior, including a queue size corresponding to the maximum delay.

FIG. 9 illustrates the resulting queuing behavior, including the queue size corresponding to the maximum delay. FIG. 9 plots Time in the x-axis against the cumulative number of items in the y-axis. By estimating the arrival rate and service rate, we can compute expected queue size and therefore the delay of the flow. Based on the buffer size, the video quality problems may be estimated by the computed delay. The resources that impact the service rate are then assessed for allocating to the flows with specific delay requirements.

Figure 10A:
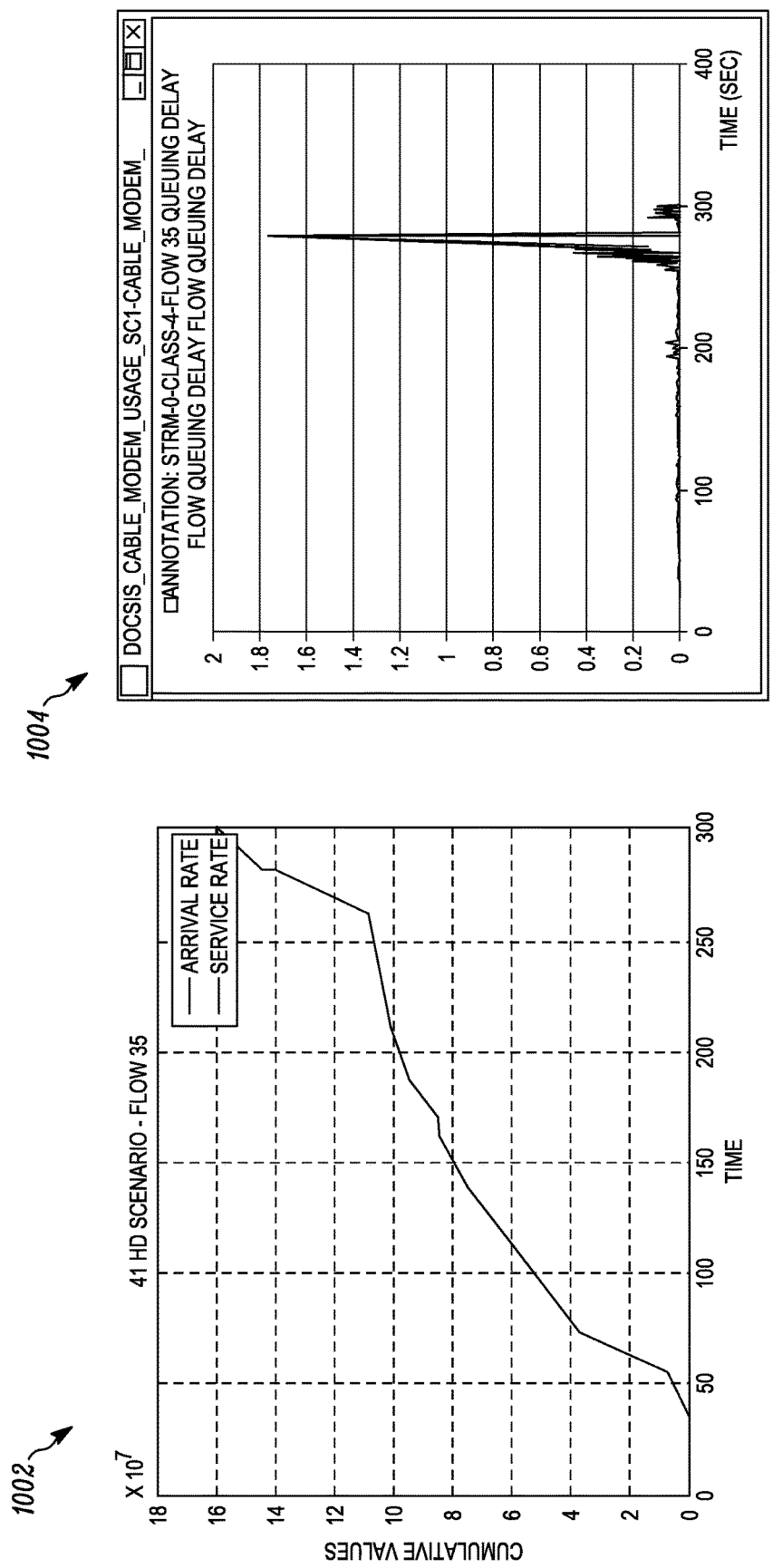
FIG. 10A represents simulation results of time (x-axis) vs. cumulative values (y-axis) for a DOCSIS 3.0 example.
Figure 10B:
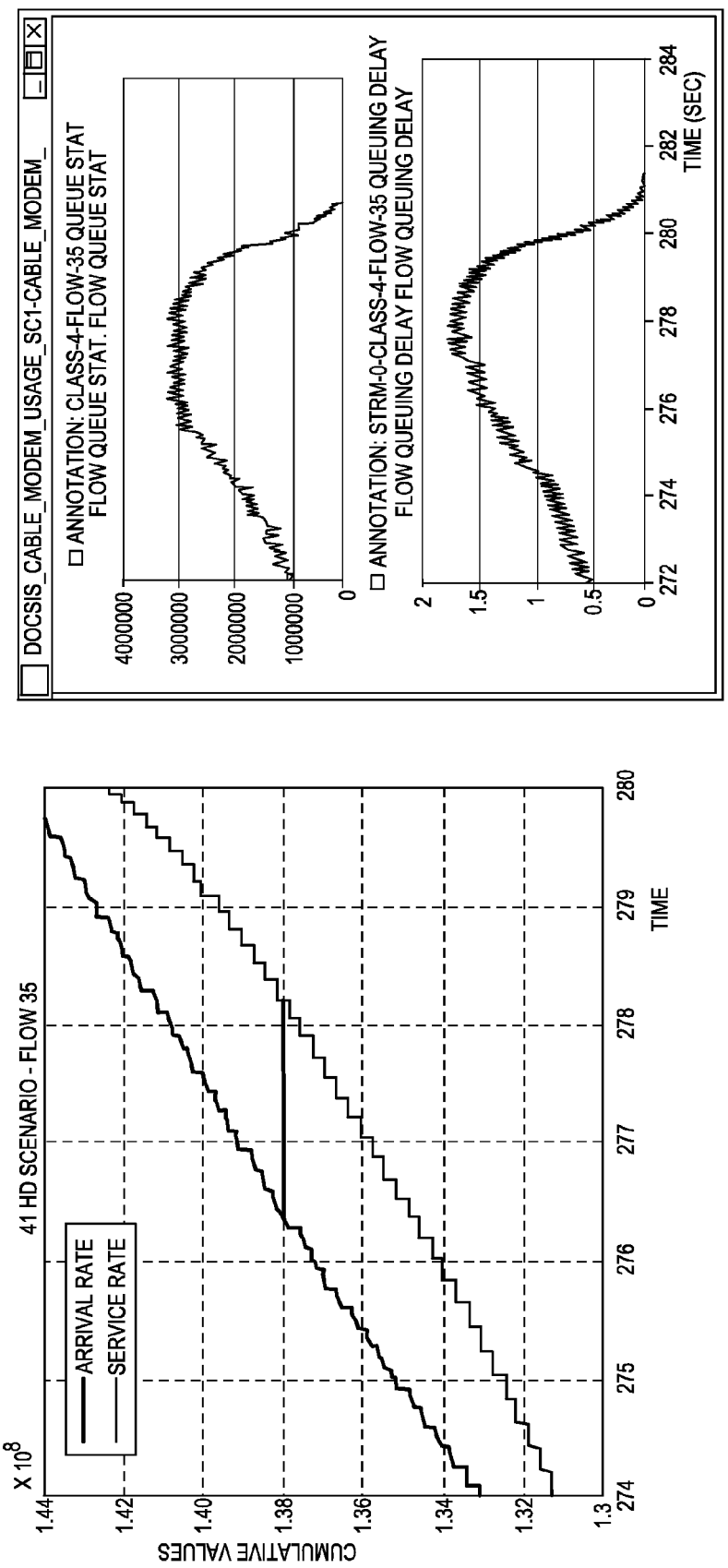
FIG. 10B represents another simulation result of time (x-axis) vs. cumulative values (y-axis) for a DOCSIS 3.0 example.

The results in FIGS. 10A and 10B represent simulation results of time (x-axis) vs. cumulative values (y-axis) of arrival and service rates for a DOCSIS 3.0 example. In this example, 41 HD (High Definition Video) are multiplexed as VBR traffic. The left graph in FIG. 10A displays the arrival and service rate of a flow. The right graph in FIG. 10A displays the queuing delay for this flow. The left graph in FIG. 10B is the zoomed version of the left graph in FIG. 10A for the time interval with maximum delay. Comparing the left graph in FIG. 10B to FIG. 9 shows a corresponding queuing behavior. The difference between arrival and service rates, i.e traffic rate and network throughput, yield the queue size. The right graph in FIG. 10B shows the queue size and delay for this flow at the corresponding time interval.

Figure 11:
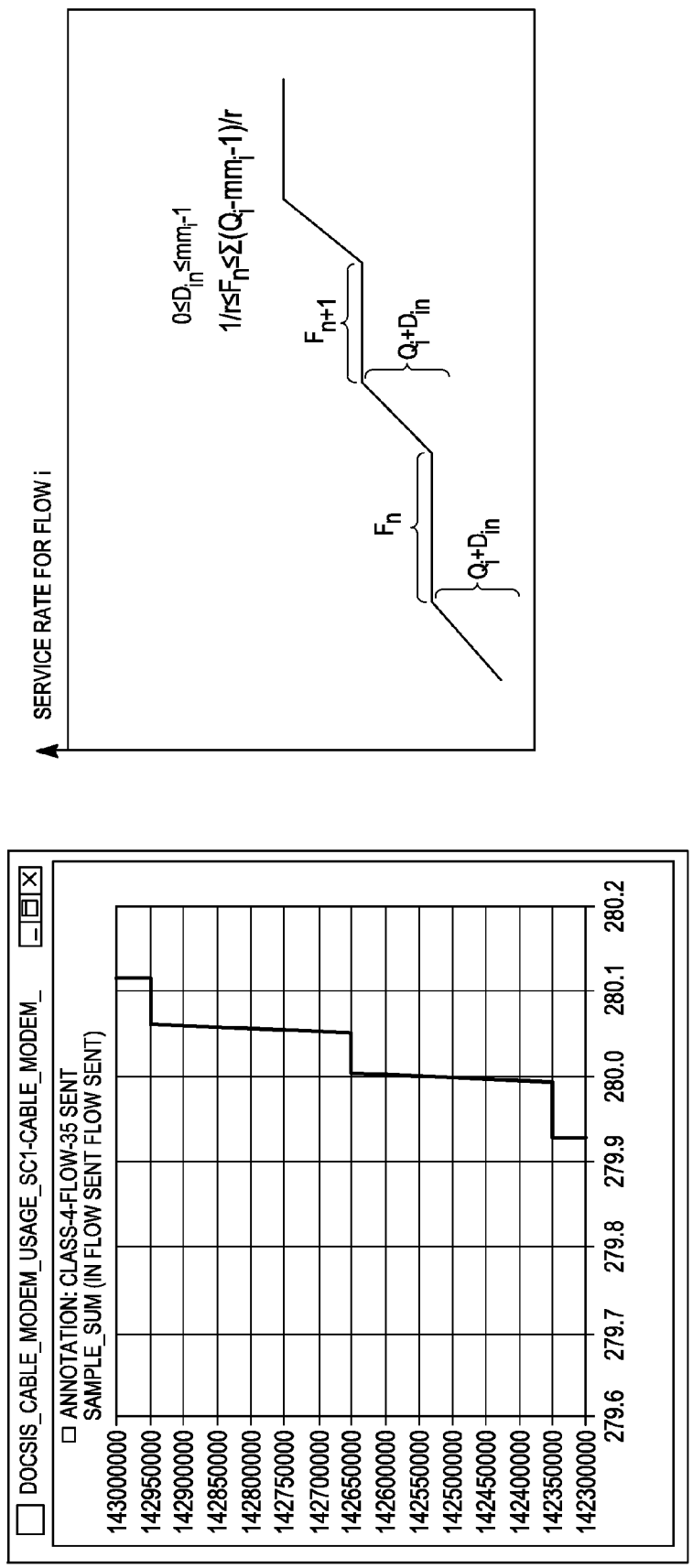
FIG. 11 demonstrates a graph showing the service rate of a flow.

FIG. 11 demonstrates that the service rate of the flow can be computed from the video traffic information, quantum and maximum deficit sizes, as explained above. The left graph in FIG. 11 represents simulation results showing the service rate for the DRR based DOCSIS scheduler. The right graph in FIG. 11 represents the mathematical formulation of the graph on the left. FIG. 11 demonstrates the mathematical formulation that may be used to estimate delay bounds. It is noted that for this simulation example, the service from the default queue was kept at minimum.

Admission control and rate adaptation are now described with results from an example implementation of admission control with rate adaptation. In this example, the admission control with rate adaptation is based on a delay bound computation of a CMTS DS scheduler.

Figure 12:
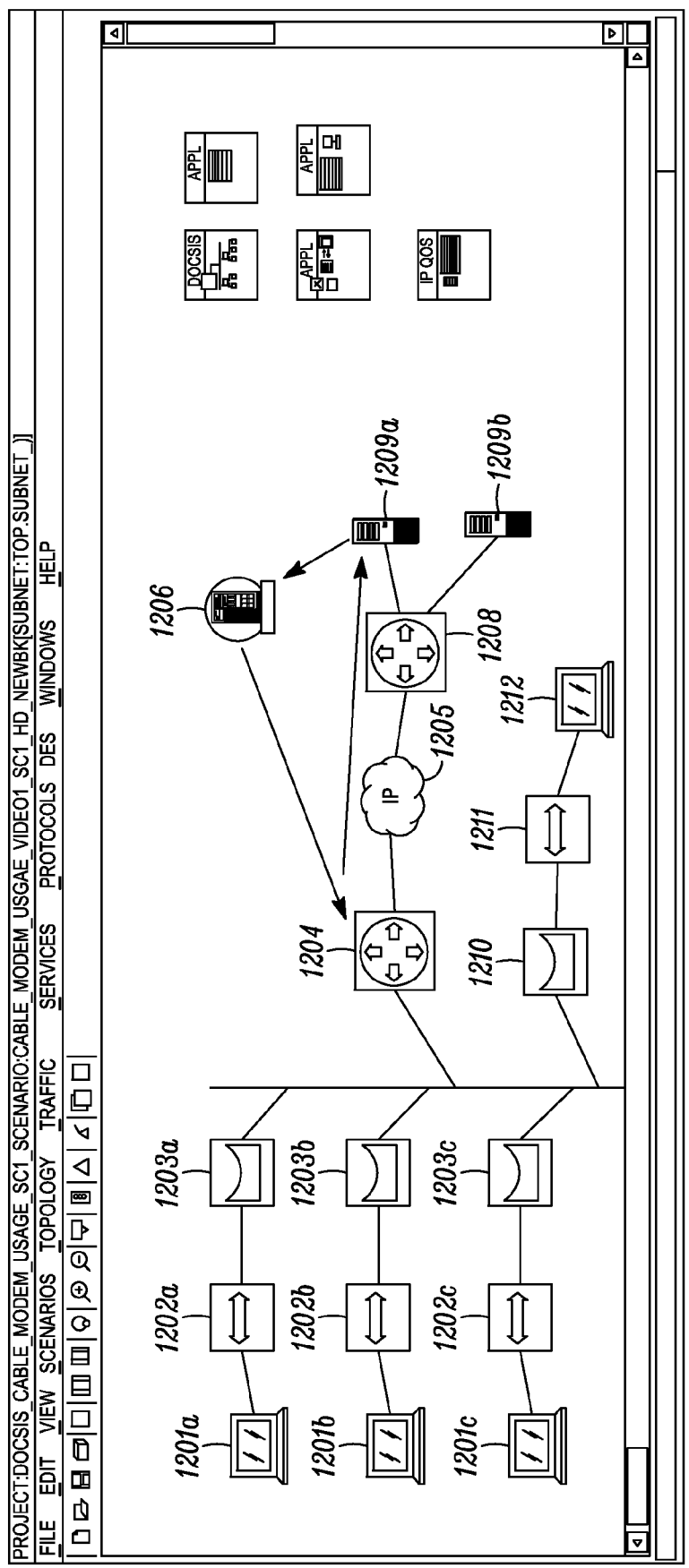
FIG. 12 depicts a simulation model for admission control.

FIG. 12 depicts the simulation model. The admission control is implemented in matlab to define the flows that can be accepted. Three flows are represented from three sources, source #1 defined by user device 1201a, hub 1202a, and cable modem 1203a; source #2 defined by user device 1201b, hub 1202b, and cable modem 1203b; and source #N defined by user device 1201n, hub 1202n, and cable modem 1203n, where N and n represent any number of flows that may be received.

The video source located in the Remote Server node 1209a gets measurement time interval from the traf_stat node 1206, and sends the traffic information for the next time interval to the "traf_stat" node 1206 that keeps traffic information for each flow. The CMTS node 1204 maps each video flow to DOCSIS flow, takes traffic information from "traf_stat" for each measurement time interval and computes delay bounds. If the delay bound is exceeded, a lower rate is applied for the flows with highest offered rates until the delay bound is reduced to the acceptable levels. Note that the selection of flows may be done randomly, based on a priority order or fairness index. The rate changes for each flow are kept during runtime to make sure that flows that exceeded the percentage of not using premium rates are not selected for rate change. The request for rate change is sent back to the remote server node 1209b that sources the video.

Figure 13:
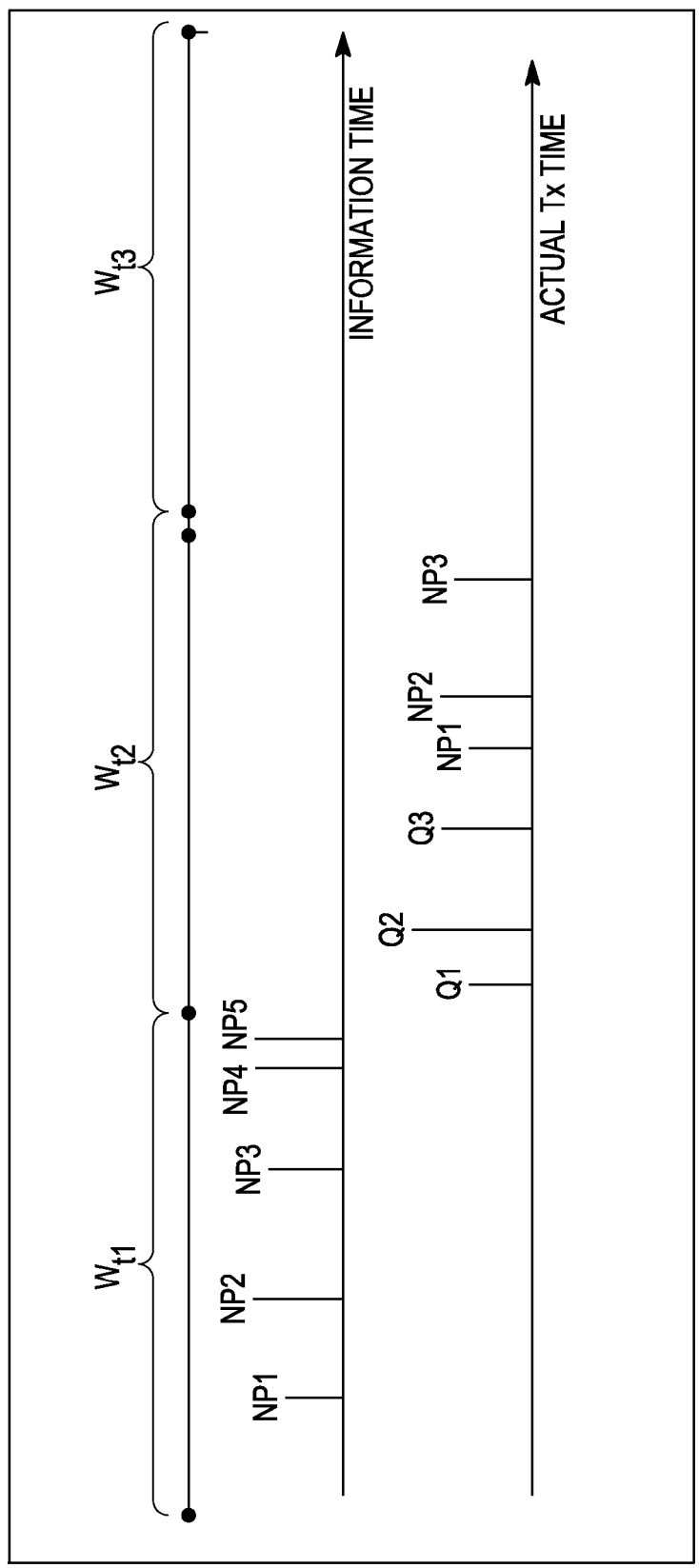
FIG. 13 depicts different actions related to transmission times for queued packets to optimize rate adaptation.

The selection of measurement times and available traffic information during these times define the accuracy of the delay bound computation. For example, DRR scheduler is implemented based on active flow orders, not on the earliest deadline or highest delay values. As illustrated in FIG. 13, transmission times for NP4 and NP5 frames depend on queued packets until Wt3 and arrivals at Wt2. Therefore, different actions may be taken to optimize the rate adaptation One may adjust the rate of flows at Wt1 (selecting W based on delay bound and assuming all arrivals at the beginning of W) or adjust the rate of flows at Wt2 (considering computation at Wt1). For this kind of problems, known video traffic characteristics may be used. For example, long range dependence of video traces would indicate that next measurement time would have big size frames with a high probability for a flow with big size frames in the current measurement time, assuming that measurement time is in the order of GOP time.

The system architecture that may implement the disclosed techniques may be implemented in a variety of ways to distribute traffic control functionalities and signaling between modules.

In embodiments, the system architecture includes encoders and rate control modules in separate locations, and connected through an IP network, e.g. LAN or WAN. In embodiments, the system requires constant video measurements (e.g., bitrate, complexity), video information (e.g. resolution) and available bandwidth (buffers should be adjusted for this information). In embodiments, multicasting is used for signaling.

Although the disclosed techniques can benefit from a tightly synchronized network, since traffic control is based on delay bound computation for admission control with rate adaptation, a tight synchronization is not as crucial. The delay guard bands can be defined as such that estimated time errors can still be accommodated at the expense of lower utilization.

In absence of Packet Cable MultiMedia (PCMM) or Dynamic Quality of Service (DQoS) compliance, both admission control and rate adaptation may be implemented at the CMTS where a new signaling between CMTS and video sourcing (e.g. encoders) is established (it is assumed that all video destinations are of Client Type 1). The policies may be configured at CMTS where parameters may be changed through service provider management.

If PCMM is implemented, the policy from PCMM may be signaled to the traffic module (pull or push methods) which is connected to the CMTS DS scheduler. The signaling from application server or managers may be used for a-priori information distribution. The functions defined herein may be implemented in other centralized controllers as an appliance or software in common entities.

Figure 14:
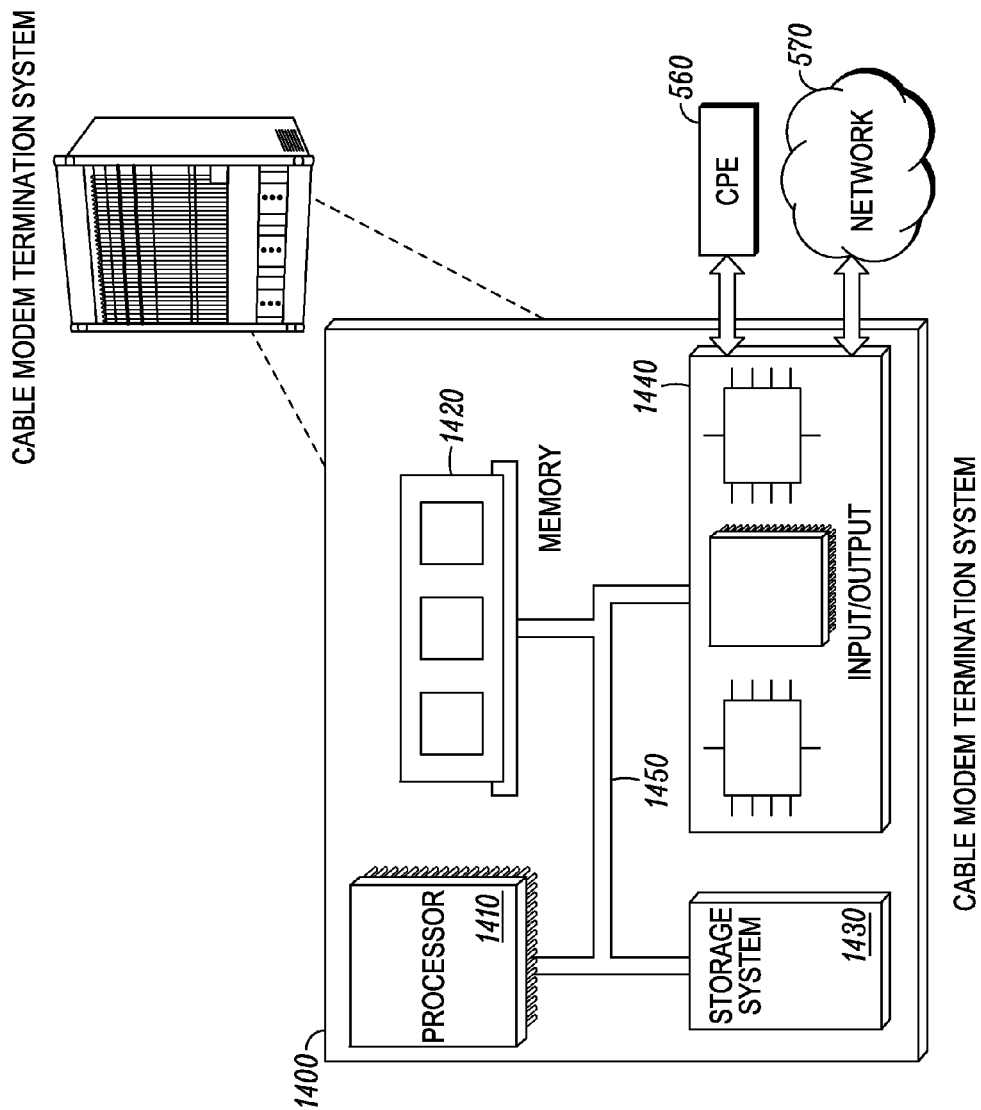
FIG. 14 is a block diagram of an example CMTS device that can include admission control functionality as disclosed.

FIG. 14 is a block diagram of an example CMTS device that can include the disclosed admission control functionality. However, it should be understood that many different kinds of network devices (e.g., including network hubs, bridges, routers, edge termination devices, etc.) can implement the congestion control. The CMTS 1400 can include a processor 1410, a memory 1420, a storage device 1430, and an input/output device 1440. Each of the components 1410, 1420, 1430, and 1440 can, for example, be interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

In some implementations, the storage device 1430 is capable of providing mass storage for the system 1400. In one implementation, the storage device 1430 is a computer-readable medium. In various different implementations, the storage device 1430 can, for example, include a hard disk device, an optical disk device, flash memory or some other large capacity storage device.

The input/output device 1440 provides input/output operations for the system 1400. In one implementation, the input/output device 1440 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices 1460 (e.g., set top box, cable modem, etc.), as well as sending communications to, and receiving communications from a network 1470. Other implementations, however, can also be used, such as mobile computing devices, mobile communication devices, set-top box television client devices, etc.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

A computer-readable storage medium may have stored thereon instructions that, when executed, cause a processor to divide the OFDM channel in to a plurality of modulation tiers across the plurality of subcarriers based on a modulation level. Instructions further cause the processor to define a metric associated with a measurable characteristic of the network elements, wherein at least one metric value for the metric is associated with each of the plurality of modulation tiers, and collect measurements for a plurality of the network elements communicating over the OFDM channel, each measurement corresponding to one of the plurality of network elements and a respective one of the plurality of subcarriers. For each of the plurality of network elements, the instructions cause the processor to translate the measurements collected for the respective network element for comparison to the metric values associated with the plurality of tiers, and allocate each of the plurality of network elements to a tier in the plurality of modulation tiers based on the comparison of the measurements collected for the plurality of network elements to the metric values associated with the plurality of modulation tiers.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. A network-based method for managing adaptive streaming resources in a hetnet cable Wi-Fi network, the method comprising:
    determining an application fairness index defining a medium usage for each flow in a flow group, wherein the application fairness index for each flow is a function of the medium usage of other flows in the flow group in a same session;
    determining a resource margin for a service area associated with the session, wherein a service area includes a plurality of clients, and wherein the resource margin is a measurement determined for the service area based on bandwidth at both a network location and at least one Wi-Fi component in a session path corresponding to the session;
    receiving an adaptive bit rate streaming request from a client in the service area, wherein the request is indicative of a requesting client's link quality;
    determining whether to accept the adaptive bit rate streaming request based on the application fairness index whether the margin is below a margin threshold,
    wherein responsive to an acceptance of the adaptive bit rate streaming request in some cases, adjusting a rate for at least one flow in the flow group, and, based on the adjusted rate, updating the application fairness index for each flow in the flow group and updating the margin for the service area, and
    wherein the fairness index is adjusted based on the margin threshold in other cases, but adjustment to the bit rate is not made based upon acceptance of the adaptive bit rate streaming request; and
    responsive to a rejection of the adaptive bit rate streaming request, maintaining the application fairness index and margins for the flow group.

2. The method of claim 1,
    wherein the adaptive bit rate streaming request from the client is a request to reduce or decrease the bit rate of a flow transmitting to the client, and
    wherein further the resource margin has a bandwidth increase or decrease for the service area entirety to maintain the bandwidth consistently available, even when the individual flow bit rate is reduced in that service area.

3. The method of claim 1, wherein the at least one flow in the flow group for which the rate is adjusted is at least one of:
    the flow to the requesting client;
    one of the other flows in the flow group;
    a flow selected based on a respective application fairness index; or
    a flow selected on a multiple service operator's rate requirements.

4. The method of claim 1, wherein the adjustment to the rate for the at least one flow in the flow group is a reduction in the rate of the at least one flow.

5. The method of claim 1, wherein the client in the service area associated with the session is at least one of:
    a client with an active flow requesting a modification to the flow, or
    a new client in the service area requesting a new flow to be delivered.

6. The method of claim 1, further comprising comparing the determined margin to a margin threshold.

7. The method of claim 1, wherein the application fairness index differentiates link quality to specific client locations and is indicative of specific client device issues.

8. The method of claim 1, further comprising comparing the updated margin to the margin threshold and, responsive to determination that the updated margin is less than the threshold, reducing rates of selected flows and updating the fairness index based on the reduced rates.

9. The method of claim 1, wherein each flow for which an application fairness index is determined corresponds to a client, the application fairness index a function of a client adaptive bit rate request originating with the client.

10. The method of claim 1, wherein the flow group in the same session for which the application fairness index is a function, is a group of flows grouped based on use of a same network path.

11. The method of claim 1, wherein a flow group is defined by all of the flows sharing an access point, and adjusting a rate for at least one flow in the flow group comprises adjusting a rate for all flows sharing the same access point.

12. The method of claim 1, wherein the resource margin is determined based on a delay bound, wherein the adaptive bit rate streaming request from the client is accepted if the probabilities for each flow to exceed a delay bound is within an acceptable range.

13. A cable modem termination system (CMTS) in a service provider's network for managing adaptive streaming resources in a hetnet cable Wi-Fi network, the CMTS comprising:
   a storage device
   a processor configured to:
      determine an application fairness index defining a medium usage for each flow in a flow group, wherein the application fairness index for each flow is a function of the medium usage of other flows in the flow group in a same session;
      determine a resource margin for a service area associated with the session, wherein a service area includes a plurality of clients, and wherein the resource margin is a measurement determined for the service area based on bandwidth at both a network location and at least one Wi-Fi component in a session path corresponding to the session;
   at least one receiver for receiving an adaptive bit rate streaming request from a client in the service area, wherein the request is indicative of a requesting client's link quality;

the processor further configured to determine whether to accept the adaptive bit rate streaming request based on the application fairness index whether the margin is below a margin threshold, wherein responsive to an acceptance of the adaptive bit rate streaming request in some cases, adjusting a rate for at least one flow in the flow group, and, based on the adjusted rate, updating the application fairness index for each flow in the flow group and updating the margin for the service area wherein the fairness index is adjusted based on the margin threshold in other cases, but adjustment to the bit rate is not made based upon acceptance of the adaptive bit rate streaming request, and wherein responsive to a rejection of the adaptive bit rate streaming request, maintaining the application fairness index and margins for the flow group.

14. The CMTS of claim 13, wherein the adaptive bit rate streaming request from the client is a request to reduce or decrease the bit rate of a flow transmitting to the client, and wherein further the resource margin has a bandwidth increase or decrease for the service area entirety to maintain the bandwidth consistently available, even when the individual flow bit rate is reduced in that service area.

* * * * *